Nov. 28, 1944.     J. McLINTOCK     2,363,605
PISTON AND CYLINDER CONSTRUCTION
Filed June 11, 1943

Inventor
J. McLintock
By Glaswick Downing & Seabold
Attys

Patented Nov. 28, 1944

2,363,605

UNITED STATES PATENT OFFICE 2,363,605

PISTON AND CYLINDER CONSTRUCTION

John McLintock, Mount Vernon, Glasgow, Scotland

Application June 11, 1943, Serial No. 490,538
In Great Britain July 27, 1942

1 Claim. (Cl. 309—1)

This invention has reference to piston and cylinder construction wherein a piston reciprocates within a cylinder.

The present invention has for its object to provide improvements whereby wear of the cylinder wall of a reciprocating engine, including air compressors, will be substantially eliminated.

Figure 1:
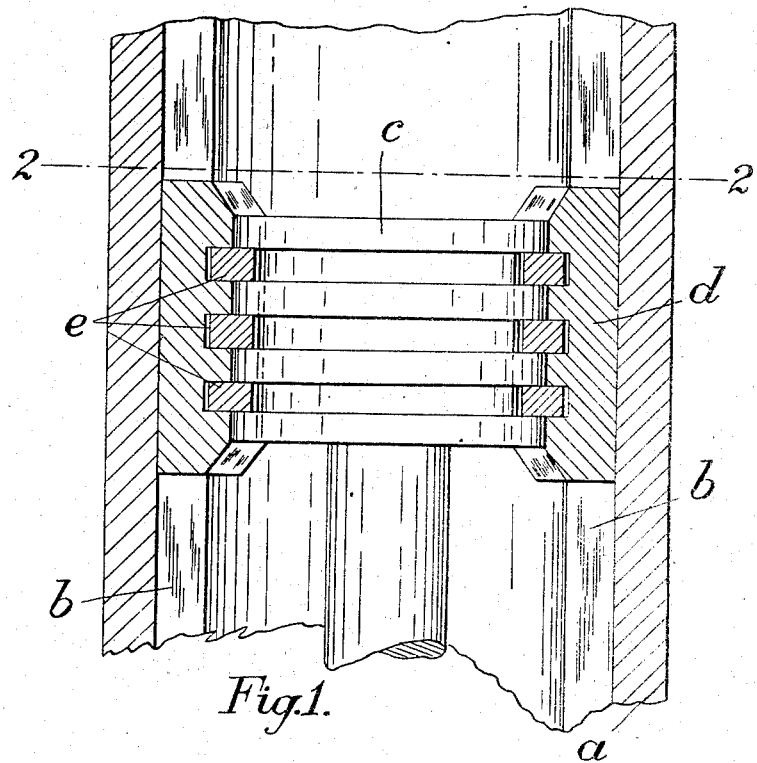
Figure 2:
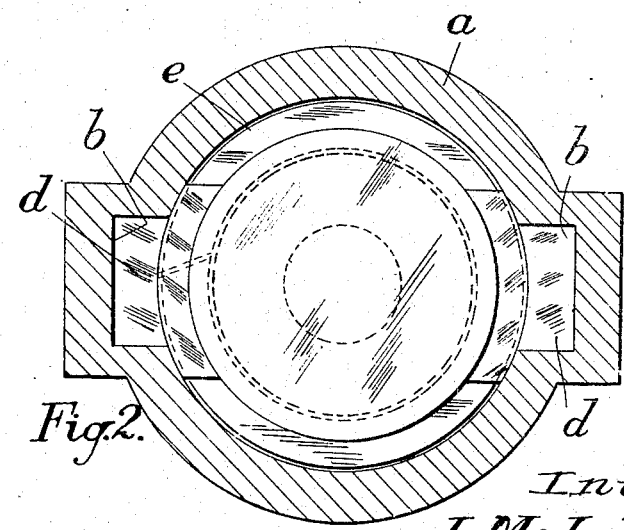

On the annexed sheet of drawing is illustrated by way of example a preferred embodiment of the invention wherein:

Figure 1 is a sectional elevation of part of the cylinder and piston located therein and Figure 2 is a section on the line 2—2.

In the drawing $a$ designates the cylinder of an engine, compressor or the like. The wall of the cylinder is provided with two diametrically opposite longitudinally or axially extending recesses $b,b$. Each recess may be the same length or substantially the same length as the cylinder, while the breadth thereof may be as found convenient, e. g. it may be about $\frac{1}{10}$ of the circumference of the cylinder.

The depth of each recess may be somewhat more than the thickness of the cylinder wall.

The piston $c$ is of usual construction except that bearing shoes $d$ and $d$ are secured thereto on diametrically opposite sides, the said shoes fitting within the said recesses $b,b$, and being of such size that they make a good working fit therein.

The bearing shoes are at least the length of the piston and bear throughout their length on all faces of the recesses into which they fit.

The inner face of each shoe is provided with a number of circumferentially extending recesses of such size and so positioned that the usual split piston rings $e$ carried by the piston are snugly accommodated therein, the shoes being thereby prevented from axial movement relative to the piston.

In introducing the piston together with the bearing shoes into the cylinder it is preferable first to introduce thin liners to bear against the back of the said recesses and when the piston and bearing shoes are introduced said liners are then withdrawn.

The piston rings $e$ in addition to preventing relative axial movement of the shoes $d$ and piston $c$ have the effect of forcing the shoes outwardly so that the piston is held centrally in its cylinder and the wear and tear is taken up not by the piston and the piston rings but by the said bearing shoes which of course can be readily renewed if found necessary.

By such improvements there is little or no wear in the piston and piston rings so that loss by the escape of fluid between the piston and cylinder is substantially avoided.

If desired, the number of longitudinally extending recesses and bearing shoes may be varied as found desirable, e. g. in certain instances there may be a single recess and bearing shoe, such arrangement being suitable in the case of a horizontal cylinder, the recess and shoe being then on the underside thereof. Or, if desired, there may be three, four or even more recesses and shoes.

It will be understood that the piston may be secured to the piston rod by means of a gudgeon pin.

I claim:

A piston and cylinder assembly embodying a cylinder having at least one longitudinally or axially extending recess in the cylindrical wall thereof, a piston with piston rings working in said cylinder, bearing shoes, corresponding in number to the number of recesses in the cylindrical wall, carried by said piston and each fitting into a recess, each shoe extending at least the length of the piston and bearing throughout its length on all faces of the recess into which it fits, and each having circumferential recesses into which the piston rings fit to lock same to the piston.

JOHN McLINTOCK.